United States Patent [19]
Sandstrom et al.

[11] Patent Number: 6,024,146
[45] Date of Patent: Feb. 15, 2000

[54] PNEUMATIC TIRE HAVING AN INNERLINER OF A CURED RUBBER COMPOUND CONTAINING TRANS 1,4-POLYBUTADIENE RUBBER

[75] Inventors: Paul Harry Sandstrom, Tallmadge; Raymond Benjamin Roennau, Stow, both of Ohio

[73] Assignee: The Goodyear Tire & Rubber Company, Akron, Ohio

[21] Appl. No.: 08/236,839

[22] Filed: May 2, 1994

[51] Int. Cl.⁷ ........................................... B60C 5/14
[52] U.S. Cl. .......................... 152/510; 525/192; 525/237
[58] Field of Search ................... 152/510, 511; 525/235, 237, 192, 233

[56] References Cited

U.S. PATENT DOCUMENTS

| | | | |
|---|---|---|---|
| 4,048,427 | 9/1977 | Hargis et al. | 526/337 |
| 4,790,365 | 12/1988 | Sandstrom et al. | 152/510 |
| 5,005,625 | 4/1991 | Klemmensen et al. | 152/510 |
| 5,229,459 | 7/1993 | Sandstrom et al. | 525/136 |

FOREIGN PATENT DOCUMENTS

| | | |
|---|---|---|
| 1720314 | 6/1971 | Germany . |
| 3630535 | 3/1987 | Germany . |
| 60-197749 | 10/1985 | Japan . |
| 1159628 | 7/1969 | United Kingdom . |

*Primary Examiner*—Geoffrey L. Knable
*Attorney, Agent, or Firm*—Bruce J. Hendricks

[57] ABSTRACT

The present invention relates to a pneumatic rubber tire having an integral innerliner of a sulfur cured rubber compound. The rubber compound is characterized by, based on 100 parts of ruber, (A) from about 70 to 98 parts by weight of bromobutyl rubber, (B) from 2 to 30 parts by weight of a trans 1,4-polybutadiene rubber having at least a 65 percent trans 1,4-content; and (C) from 0 to 28 parts by weight of a rubber selected from the group consisting of an acrylonitrile/butadiene copolymer, styrene/butadiene copolymer, natural rubber and mixtures thereof.

9 Claims, No Drawings

PNEUMATIC TIRE HAVING AN INNERLINER OF A CURED RUBBER COMPOUND CONTAINING TRANS 1,4-POLYBUTADIENE RUBBER

BACKGROUND OF THE INVENTION

The inner surface of a pneumatic tire is typically comprised of an elastomeric composition designed to prevent or retard the permeation of air and moisture into the carcass from the tire's inner air chamber. It is often referred to as an innerliner. Innerliners have also been used for many years in tubeless pneumatic vehicle tires to retard or prevent the escape of air used to inflate the tire, thereby maintaining tire pressure. Rubbers, such as halobutyl and blends of butyl and halobutyl rubber, which are relatively impermeable to air are often used as a major proportion of the innerliners.

The innerliner is normally prepared by conventional calendering or milling techniques to form a strip of uncured compounded rubber of appropriate width which is sometimes referred to as a gum strip. Typically, the gum strip is the first element of the tire applied to a tire building drum, over and around which the remainder of the tire is built. When the tire is cured, the innerliner becomes an integral, co-cured, part of the tire. Tire innerliners and their methods of preparation are well known to those having skill in such art.

The preparation of a gum strip composed entirely of compounded chlorobutyl or bromobutyl rubber or blends of chlorobutyl or bromobutyl rubber with butyl rubber has been observed to have some processing and fabrication problems such as sticking to processing equipment during the milling and calendering operations.

Furthermore, it has sometimes been desired to provide a gum strip composition for the innerliner which has suitable processing properties, sufficient green strength, building tack in its uncured state and cured adhesion to the tire carcass while also having a satisfactory degree of air impermeability.

Halobutyl and butyl rubbers are also the most expensive rubber used in a tire. Given the competitive tire market and the continued need to lower the cost of manufacturing tires without sacrificing properties, there exists a need to eliminate or substantially decrease the cost of innerliners which perform such an important function in the performance of a tire.

SUMMARY OF THE INVENTION

The present invention relates to a pneumatic rubber tire having an integral innerliner of a sulfur cured rubber compound. The rubber compound contains, based on 100 parts by weight of total rubber, (A) from 70 to 98 parts by weight of bromobutyl rubber; (B) from 2 to 30 parts by weight of a trans 1,4-polybutadiene rubber; and (C) from 0 to 28 parts by weight of a rubber selected from the group consisting of acrylonitrile/butadiene copolymer, styrene/butadiene copolymer, natural rubber and mixtures thereof.

DETAILED DESCRIPTION OF THE INVENTION

The present invention relates to a pneumatic rubber tire having an integral innerliner of a sulfur cured rubber compound. The sulfur cured rubber compound contains from 2 to 30 parts by weight of a trans 1,4-polybutadiene rubber. Preferably, the sulfur cured rubber compound contains 5 to 15 parts by weight of a trans 1,4-polybutadiene rubber. Use of trans 1,4-polybutadiene increases the green strength of the rubber compound which improves the handling and processing of the rubber compound to be used in building the green tire. Unexpectedly, the addition of the trans 1,4-polybutadiene rubber increases the green strength substantially, without subsequently detracting from mechanical or barrier properties of the cured tire.

Generally speaking, the trans 1,4-polybutadiene can be characterized by having the weight percent of 1,4-bonds ranging from about 65 to about 90 percent, about 5 to 20 weight percent of its units of a vinyl 1,2-structure and 2 to 15 weight percent of its units of a cis 1,4-structure. Preferably, such trans 1,4-polybutadiene is characterized by having about 75 to about an 85 percent of its butadiene repeat units of a trans 1,4-isomeric structure, about 12 to about 18 percent of its units of a 1,2-structure and about 3 to about 8 percent of its units of a cis 1,4-structure and, in its uncured state, a first major melting point in the range of about 35° C. to about 45° C. and a second minor melting point in the range of about 55° C. to about 65° C. Preferably, the first major and second minor melting points are separated by at least 15° C. and a 20° C. difference is particularly preferred.

The trans 1,4-polybutadiene preferably has a Mooney value of greater than 50 or a number average molecular weight value (Mn) measured by GPC of greater than 130,000.

The trans 1,4-polybutadiene utilized by this invention can be prepared by anionic polymerization by batch polymerizing 1,3-butadiene in an organic solvent and in the presence of cobalt octoate and triethyl aluminum as a catalyst system with a para alkyl substituted phenol as a catalyst modifier.

Trans 1,4-polybutadiene is normally prepared utilizing transition metal catalysts or rare earth catalysts. The synthesis of trans 1,4-polybutadiene with transition metal catalysts is described by J. Boor, Jr., "Ziegler-Natta Catalysts and Polymerizations", Academic Press, New York, 1979, Chapters 5–6. The synthesis of trans 1,4-polybutadiene with rare earth metal catalysts is described by D. K. Jenkins, Polymer, 26, 144 (1985).

Other than the trans 1,4-polybutadiene, the remaining rubber components in the rubber compound for use as an innerliner may vary depending on the desired properties. For example, based on 100 parts by weight of total rubber, from about 70 to 98 parts by weight is chlorobutyl rubber, bromobutyl rubber. Preferably, the amount ranges from about 85 to 95 parts by weight. In addition to the butyl type rubber, the rubber compound, based on 100 parts by weight, may contain from about 0 to 28 parts by weight of a nonbutyl type rubber selected from the group consisting of acrylonitrile/butadiene copolymer, styrene/butadiene copolymer, natural rubber and mixtures thereof. Preferably, the amount of the nonbutyl type rubber ranges from about 0 to 20 parts by weight. The desirability of using a nonbutyl type rubber will vary depending on price, properties and the amount used of such rubbers. The preferred nonbutyl type rubber is an acrylonitrile/butadiene copolymer.

The rubber compound containing the trans 1,4-polybutadiene may be compounded with conventional rubber compounding ingredients. Conventional ingredients commonly used in rubber vulcanizates are, for example, carbon black, tackifier resins, processing aids, talc, clay, mica, silica, antioxidants, antiozonants, stearic acid, activators, waxes, oils and peptizing agents. As known to those skilled in the art, depending on the intended use of the sulfur vulcanized rubber, certain additives mentioned above are commonly used in conventional amounts. Typical additions of carbon black comprise from about 10 to 100 parts by weight based on 100 parts by weight of rubber (phr), preferably 40 to 70 phr. Typical amounts of talc, clay, mica, silica and calcium carbonate may range from about 2 to 25 phr. Typical amounts of tackifier resins comprise about 2 to 10 phr. Typical amounts of processing aids comprise about 1 to 15 phr. Typical amounts of antioxidant comprise 1 to 5 phr. Typical amounts of stearic acid comprise 0.50 to about 2 phr. Typical amounts of zinc oxide comprise 1 to 5 phr. Typical amounts of oils comprise 2 to 30 phr. The presence and relative amounts of the above additives are not an aspect of the present invention.

The vulcanization of the compound for use as an innerliner is conducted in the presence of a sulfur vulcanizing agent. Examples of suitable sulfur vulcanizing agents include elemental sulfur (free sulfur) or sulfur donating vulcanizing agents, for example, an amine disulfide, polymeric disulfide or sulfur olefin adducts. Preferably, the sulfur vulcanizing agent is elemental sulfur. As known to those skilled in the art, sulfur vulcanizing agents are used in an amount ranging from about 0.2 to 5.0 phr with a range of from about 0.5 to 3.0 being preferred.

Accelerators are used to control the time and/or temperature required for vulcanization and to improve the properties of the vulcanizate. A single accelerator system may be used, i.e., primary accelerator in conventional amounts ranging from about 0.5 to 3.0 phr. In the alternative, combinations of 2 or more accelerators may be used which may consist of a primary accelerator which is generally used in the larger amount (0.3 to 3.0 phr), and a secondary accelerator which is generally used in smaller amounts (0.05–1.0 phr) in order to activate and to improve the properties of the vulcanizate. Combinations of these accelerators have been known to produce a synergistic effect on the final properties and are somewhat better than those produced by either accelerator alone. In addition, delayed action accelerators may be used which are not effected by normal processing temperatures but produce satisfactory cures at ordinary vulcanization temperatures. Suitable types of accelerators that may be used are amines, disulfides, guanidines, thioureas, thiazoles, thiurams, sulfenamides, dithiocarbamate and xanthates. Preferably, the primary accelerator is a disulfide or sulfenamide.

In practice the rubber compound is formed into a gum strip. As known to those skilled in the art, a gum strip is produced by a press or passing a rubber compound through a mill, calender, multihead extruder or other suitable means. Preferably, the gum strip is produced by a calender because greater uniformity is believed to be provided. The uncured gum strip is then constructed as an inner surface (exposed inside surface) of an uncured rubber tire structure, also known as the carcass. The innerliner is then sulfur cocured with the tire carcass during the tire curing operation under conditions of heat and pressure.

Vulcanization of the tire of the present invention is generally carried out at temperatures of between about 100° C. and 200° C. Preferably, the vulcanization is conducted at temperatures ranging from about 110° C. to 180° C. Any of the usual vulcanization processes may be used such as heating in a press or mold, heating with superheated steam or hot salt or in a salt bath. Preferably, the heating is accomplished in a press or mold in a method known to those skilled in the art of tire curing.

As a result of this vulcanization, the innerliner becomes an integral part of the tire by being cocured therewith.

Typically, the innerliner of the present invention has an uncured gum thickness in the range of from about 0.04–0.4 centimeters. Preferably, the innerliner has an uncured gum thickness in the range of from about 0.08 to about 0.20 centimeters. As a cured innerliner, the innerliner may have a thickness ranging from about 0.02 to about 0.35 centimeters. Preferably, the thickness will range from about 0.04 to about 0.15 cm thickness.

The pneumatic tire with the integral innerliner may be constructed in the form of a passenger tire, truck tire, or other type of bias or radial pneumatic tire.

The following examples are presented in order to illustrate but not limit the present invention. The parts and percentages are by weight unless otherwise noted.

EXAMPLE

Two samples of sulfur cured rubber compounds were prepared and tested. Table I lists the ingredients which were present in each of the two samples. Sample 1 was a control and Sample 2 represents an embodiment of the present invention.

TABLE I

|  | Sample 1 | Sample 2 |
| --- | --- | --- |
| Bromobutyl rubber | 100 | 90 |
| Trans 1,4-polybutadiene | 0 | 10 |
| Carbon black | 50 | 50 |
| Oil | 2 | 2 |
| Processing aids | 10 | 10 |
| Tackifier | 3 | 3 |
| Stearic acid | 1 | 1 |
| Zinc oxide | 1 | 1 |
| Accelerator | 1.13 | 1.13 |
| Sulfur | 1 | 1 |

The trans 1,4-polybutadiene for this example was characterized by having a trans 1,4-content of about 80 percent, a cis 1,4-content of about 5 percent and a vinyl 1,2-content of about 15 percent. It was further characterized by having a number average molecular weight (Mn) of about 205,000, a weight average molecular weight (Mw) of about 430,000 and a Mooney value of 77. It was additionally characterized by having a Tg of about −75° C. and melting points (Tm) of 40° C. (major) and 60° C. (minor). (Both the Tg and Tm were determined by differential scanning calorimeter at 10° C. per minute).

Such trans 1,4-polybutadiene can be suitably prepared by batch polymerizing 1,3-butadiene in an aliphatic hydrocarbon solution (e.g. hexane) in the presence of a catalyst of cobalt octoate and triethylaluminum with p-dodecylphenol modifier, although it can also be prepared by continuous polymerization with a suitable gel inhibitor.

The materials were mixed as a two-step mixing process by a size BR Banbury™ blender in which all of the ingredients except for sulfur and accelerator were mixed in the first stage.

Table II provides the physical data for the two samples.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained from the rubber stocks that were prepared. These properties include a torque minimum (Min. Torque), a torque maximum (Max. Torque), minutes to 25 percent of the torque increase (t25), minutes to 90 percent of the torque increase (t90) and difference between the maximum torque and minimum torque (delta torque).

Shore Hardness was determined in accordance with ASTM D-1415.

Peel adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during curing and subsequent testing.

Green strength was determined by ASTM D-412. Air permeability was determined by ASTM D-1434. Water vapor transmission was determined by E96-80, an ASTM test.

TABLE II

|  | Control BrButyl | High Trans PDB |
| --- | --- | --- |
| Rheometer, 150° C. | | |
| Torque, Max. | 18.1 | 18.5 |
| Torque, Min. | 7.0 | 7.2 |
| Delta Torque | 11.1 | 11.3 |
| t25 (mins.) | 8.3 | 8.5 |
| t90 (mins.) | 28.4 | 26.0 |
| Stress-Strain | | |
| Tensile (MPa) | 8.76 | 8.01 |
| Elongation (%) | 830 | 830 |
| 100% Modulus (MPa) | 0.93 | 0.97 |
| 300% Modulus (MPa) | 3.07 | 2.80 |
| RT Hardness | 45 | 46 |

TABLE II-continued

|  | Control BrButyl | High Trans PDB |
| --- | --- | --- |
| Green Strength @ 100% E (psi) | 6.3 | 11.6 |
| Peel Adhesion, 95° C. to Self (N) | 129 | 114 |
| Water Vapor Trans (gm-mil/hr) | 0.0172 | 0.0112 |
| Air Permeability (cc-mil) | 96 | 115 |

The substitution of 10 parts of trans 1,4-polybutadiene to the compound enhances the green strength by almost 80% compared to the control which contains no trans 1,4-polybutadiene. The other important liner properties are only slightly affected.

What is claimed is:

1. A pneumatic rubber tire having an integral innerliner of a sulfur cured rubber compound comprised of, based on 100 parts by weight of rubber, (A) 70 to 98 parts by weight of bromobutyl rubber; (B) from 2 to 30 parts by weight of a trans 1,4-polybutadiene rubber having at least a 65 percent trans 1,4-content; and (C) 0 to 28 parts by weight of a rubber selected from the group consisting of acrylonitrile/butadiene copolymer, styrene/butadiene copolymer, natural rubber and mixtures thereof.

2. The tire of claim 1 wherein from 5 to 15 parts by weight of a trans 1,4-polybutadiene rubber is used.

3. The tire of claim 1 wherein said innerliner is first constructed as an inner surface of an uncured rubber tire as an uncured compounded rubber gum strip and is then co-cured with the tire during a tire curing operation.

4. The tire of claim 3 wherein said rubber gum strip has a thickness in the range of about 0.04 to 0.4 centimeters.

5. The tire of claim 4 wherein said rubber gum strip has a thickness in the range of about 0.08 cm to about 0.2 cm.

6. The tire of claim 1 wherein said trans 1,4-polybutadiene rubber has a 65 to about a 90 percent trans 1,4-content, a 5 to about a 20 percent 1,2-content and a 2 to about a 15 percent cis 1,4-content and, in its uncured state, a first major melting point in the range of about 35° C. to about 45° C. and a second minor melting point in the range of about 55° C. to about 65° C. and a Mooney value greater than 50.

7. The tire of claim 1 wherein from about 85 to 95 parts by weight of said rubber is bromobutyl rubber.

8. The tire of claim 1 wherein component (C) of said sulfur-cured rubber compound comprises from about 0 to 20 parts by weight of a rubber selected from the group consisting of acrylonitrile/butadiene rubber, styrene/butadiene rubber, natural rubber and mixtures thereof.

9. The tire of claim 8 wherein said rubber in component (C) is acrylonitrile/butadiene copolymer.

* * * * *